United States Patent Office 3,290,255
Patented Dec. 6, 1966

3,290,255
WHITE ELECTROLUMINESCENT PHOSPHOR
Ivie Lee Smith, Cleveland, Ohio, assignor to General
Electric Company, a corporation of New York
No Drawing. Filed Sept. 30, 1963, Ser. No. 312,293
8 Claims. (Cl. 252—301.6)

This invention relates to luminescent materials or phosphors and more particularly to the preparation of an electroluminescent zinc sulfide phosphor which emits white light under electric field excitation and which is produced by a simplified procedure involving a single firing.

Electroluminescent phosphors may be used in electroluminescent lamps or cells wherein a thin layer of phosphor which may be dispersed in a suitable dielectric medium is sandwiched between a pair of conducting plates at least one of which is transparent. The lamp is in the nature of a luminous capacitor and when an alternating voltage is applied across the plates, the phosphor emits light which escapes through the transparent plate.

The first white electroluminescent phosphors were made by combining colored electroluminescent phosphors, for instance blue, green and yellow, in suitable proportions to obtain white-emitting mixtures having reasonably good appearance. In such multiple component blends, the various components tend to depreciate at different rates during life with the result that the electroluminescent lamp changes color with use. More recently, as taught in Patent 3,025,244, Aven, White Air-Fired Electroluminescent Phosphor, it was discovered that a single component electroluminescent phosphor with white emission could be prepared by incorporating blue, green, and yellow emitting centers as afforded by copper and manganese activators in zinc sulfide with chlorine coactivator. However, the method of prepartion of this and other known single component white emitting electroluminescent phosphors involves double firings, and in some cases very long firings, which make the preparations expensive in terms of fuel, time, and handling. In addition, prior single component white-emitting phosphors are not as bright as multiple component blends. Since the single component phosphor has, over multiple component blends, the advantage of color stability during life, it is apparent that a single component white electroluminescent phosphor of improved brightness which is easier and simpler to prepare is much to be desired.

Accordingly, the general object of the invention is to provide an improved method for preparing single component white-emitting electroluminescent phosphors.

More specific objects are to provide white electroluminescent phosphors having improved brightness relative to prior phosphors, the improved phosphors being obtained by a convenient method of preparation.

In accordance with my invention, I have achieved the foregoing objects by a method of preparation wherein a basic mixture of zinc sulfide, cuprous chloride, manganese carbonate, and one of the oxides from the group arsenic, antimony, and bismuth, all components being within relatively narrow ranges of proportions which will be specified below, are fired at a high temperature in a neutral atmosphere. Thereafter the product is preferably washed to remove excess compounds. Phosphors prepared in accordance with the prescribed method provide white light with as much as a five-fold improvement in brightness relative to single component white electroluminescent phosphors prepared by prior methods. They are at least as bright and generally brighter than multiple component blends and eliminate the change in color with use. The prescribed method requires only a single firing of the ingredients lasting from 1 to 8 hours, depending upon the batch size.

The compositional range at firing of a white electroluminescent zinc sulfide phosphor activated wtih copper, manganese and chlorine with antimony oxide flux in accordance with the invention is given in Table I below: in the column giving gram atoms per mole of ZnS, the pertinent element is indicated in parentheses.

TABLE I
[Firing composition: ZnS: Cu, Mn, Cl [Sb₂O₃]]

| Component | Percentage by Wt. Relative to ZnS | Gram Atoms Per Mole ZnS |
|---|---|---|
| CuCl | 0.05 to 0.2% | (Cu) 0.005 to 0.02. |
| MnCO₃ | 0.2 to 0.5% | (Mn) 0.0017 to 0.0042. |
| Sb₂O₃ | 0.002 to 0.01% | (Sb) 0.000013 to 0.000067. |

In lieu of $Sb_2O_3$, one may use $As_2O_3$ or $Bi_2O_3$ as fluxing agent in approximately the same percentage proportions by weight as indicated for $Sb_2O_3$.

A preferred mixture for maximum brightness consists of proportions of copper chloride and antimony trioxide selected at about the midpoints of the ranges given in the above table, and of manganese carbonate at the low end of the range, for instance zinc sulfide with about 0.1% by weight cuprous chloride, about 0.25% by weight manganese carbonate, and 0.005% by weight antimony trioxide. The mixture is blended, for example by sifting through a silk screen, rolling, or milling, and then fired for one or more hours at a temperature below the hexagonal-cubic transition point and in the range of 850° C. to 950° C. in a stagnant air atmosphere. The duration of the firing time will depend on the batch size of the material being prepared and must be long enough to allow phosphor development to take place throughout the bulk of the material. In general, one hour is long enough for phosphor development to take place once the required temperature has been attained; therefore the time required will be a minimum of about an hour plus whatever additional time is required to permit the innermost portion of the mass of material to attain the required temperature.

The firing is done by placing the mixture in a loosely closed container such as the inner one of a pair of telescoping silica tubes, or alternatively a crucible or tray which will allow any gases to be expelled and prevent air from diffusing back and causing excessive oxidation of the zinc sulfide.

After cooling to room temperature, the fired material is washed in the usual fashion in dilute acid and in dilute cyanide solution. For instance, it may be washed in acetic acid solution to remove free zinc oxide and then rinsed thoroughly with deionized water. Next, it is washed in potassium cyanide solution and again rinsed thoroughly with deionized water. It is then dried at a low temperature, for instance about 110° C., to complete the preparation.

White-emitting phosphors of the zinc sulfide type activated with copper and manganese and coactivated with chlorine are known to have color shift with frequency. Generally the color tends towards yellow at low frequencies and towards blue at high frequencies. For this reason, a given phosphor of this family will appear white over a limited range of frequencies only. Within the range given in Table I above, white emission at any given frequency is achieved by adjusting the concentration of manganese in accordance with the proposed frequency of operation, using smaller amounts for low frequencies and larger amounts for high frequencies.

*Example 1*

An example of a suitable phosphor preparation in accordance with the method of the invention is as follows: 20 grams of zinc sulfide, 0.02 gram of cuprous chloride, 0.05 gram of manganese carbonate, and 0.001 gram of antimony trioxide are mixed by sifting through 150 mesh silk sieve cloth. The foregoing amounts correspond to the preferred mixture stated earlier. The mixture is placed in the inner one of two telescoping silica tubes as previously described and fired for two hours at 900° C. in air. The phosphor is then washed with 25% by volume acetic acid solution, then rinsed with deionized water; the mixture is washed in 2% by weight potassium cyanide solution and then rinsed with deionized water; the mixture is then dried at 110° C.

Under electroluminescent excitation at 94 volts (R.M.S.) per mil and 60 cycles per second in dry chlorinated biphenyl (Aroclor, described in publication O–P 115 of Monsanto Chemical Company), the phosphor provides a brightness of approximately one foot-lambert. This corresponds to a brightness of two to three foot-lamberts when the phosphor is incorporated in a practical laminated electroluminescent lamp such as those of Patent 2,945,976—Fridrich et al., and is about five times greater than the brightness of previously available single component white electroluminescent phosphors. The phosphor has good particle uniformity with substantially no colored spots (blue or yellow) visible to the unaided eye such as are observed in some white electroluminescent phosphors. Different chromaticities such as tones of white (warm, cool) with the same brightnesses are available by minor quantitative variations in composition within the ranges given in Table I.

*Example 2*

As another example, the same ingredients and proportions are used as in Example 1 except that 0.001 gram of arsenic trioxide are used in lieu of antimony trioxide. Same processing is used. Results are similar but brightness is a shade lower.

*Example 3*

As another example, the same ingredients and proportions are used as in Example 1 except that 0.001 gram of bismuth trioxide is used in lieu of antimony trioxide. Same processing is used. Results show about the same brightness as when using antimony trioxide but the color is shifted slightly towards blue.

The specific examples of the invention which have been described are intended as illustrative and not as limitative of the invention whose scope is to be determined by the appended claims.

What I claim as new and desire to secure by Letters Patent of the United States is:

1. The method of preparing a single component white electroluminescent zinc sulfide phosphor which comprises making a mixture of ZnS with from 0.05 to 0.20% by weight CuCl; from 0.2 to 0.5% by weight $MnCO_3$; and from 0.002 to 0.01% by weight of a compound from the group consisting of $Sb_2O_3$, $As_2O_3$ and $Bi_2O_3$ as a fluxing agent; and firing in a loosely closed container which allows any gases to be expelled and substantially prevents air from diffusing back, at a temperature in the range of 850 to 950° C. for a minimum period of time of about one hour.

2. The method of preparing a single component white electroluminescent zinc sulfide phosphor which comprises making a mixture of ZnS with from 0.05 to 0.20% by weight CuCl; from 0.2 to 0.5% by weight $MnCO_3$; and from 0.002 to 0.01% by weight $Sb_2O_3$ as a fluxing agent; and firing in a loosely closed container which allows any gases to be expelled and substantially prevents air from diffusing back, at a temperature in the range of 850 to 950° C. for a minimum period of time of about one hour.

3. The method of preparing a single component white electroluminescent zinc sulfide phosphor which comprises making a mixture of ZnS with from 0.05 to 0.20% by weight CuCl; from 0.2 to 0.5% by weight $MnCO_3$; and from 0.002 to 0.01% by weight $As_2O_3$ as a fluxing agent; and firing in a loosely closed container which allows any gases to be expelled and substantially prevents air from diffusing back, at a temperature in the range of 850 to 950° C. for a minimum period of time of about one hour.

4. The method of preparing a single component white electroluminescent zinc sulfide phosphor which comprises making a mixture of ZnS with from 0.05 to 0.20% by weight CuCl; from 0.2 to 0.5% by weight $MnCO_3$; and from 0.002 to 0.1% by weight $Bi_2O_3$ as a fluxing agent; and firing in a loosely closed container which allows any gases to be expelled and substantially prevents air from diffusing back, at a temperature in the range of 850 to 950° C. for a minimum period of time of about one hour.

5. The method of preparing a single component white electroluminescent zinc sulfide phosphor which comprises making a mixture of ZnS with approximately 0.1% by weight CuCl, approximately 0.25% by weight $MnCO_3$, and approximately 0.005% by weight $Sb_2O_3$; and firing in a loosely closed container which allows any gases to be expelled and substantially prevents air from diffusing back, at a temperature in the range of 850 to 950° C. for a period of time of at least one hour.

6. The method of preparing a single component white electroluminescent zinc sulfide phosphor which comprises making a mixture of ZnS with approximately 0.1% by weight CuCl, approximately 0.25% by weight $MnCO_3$, and approximately 0.005% by weight $As_2O_3$; and firing in a loosely closed container which allows any gases to be expelled and substantially prevents air from diffusing back, at a temperature in the range of 850 to 950° C. for a period of time of at least one hour.

7. The method of preparing a single component white electroluminescent zinc sulfide phosphor which comprises making a mixture of ZnS with approximately 0.1% by weight CuCl, approximately 0.25% by weight $MnCO_3$, and approximately 0.005% by weight $Bi_2O_3$; and firing in a loosely closed container which allows any gases to be expelled and substantially prevents air from diffusing back, at a temperature in the range of 850 to 950° C. for a period of time of at least one hour.

8. An improved single component white electroluminescent zinc sulfide phosphor being the reaction product of firing a mixture of ZnS with from 0.05 to 0.20% by weight CuCl; from 0.2 to 0.5% by weight $MnCO_3$; and from 0.002 to 0.01% by weight of a compound from the group consisting of $Sb_2O_3$, $As_2O_3$ and $Bi_2O_3$ as a fluxing agent in a loosely closed container which allows any gases to be expelled and substantially prevents air from diffusing back, at a temperature in the range of 850 to 950° C. for a minimum period of time of about one hour.

References Cited by the Examiner

UNITED STATES PATENTS

| | | | |
|---|---|---|---|
| 2,772,242 | 11/1956 | Butler | 252—301.6 |
| 2,802,792 | 8/1957 | Butler et al. | 252—301.6 |
| 2,937,150 | 5/1960 | Lehmann | 252—301.6 |
| 2,999,818 | 9/1961 | Morrison et al. | 252—301.6 |
| 3,025,244 | 3/1962 | Aven | 252—301.6 |

TOBIAS E. LEVOW, *Primary Examiner.*

R. D. EDMONDS, *Assistant Examiner.*